United States Patent
Aepli et al.

(10) Patent No.: US 10,717,816 B2
(45) Date of Patent: *Jul. 21, 2020

(54) REINFORCED POLYAMIDE MOLDING COMPOUNDS HAVING LOW HAZE AND MOLDED BODIES THEREFROM

(71) Applicant: EMS-PATENT AG, Domat/Ems (CH)

(72) Inventors: Etienne Aepli, Domat/Ems (CH); Botho Hoffmann, Domat/Ems (CH)

(73) Assignee: EMS-PATENT AG, Domat/EMS (CH)

( * ) Notice: Subject to any disclaimer, the term of this patent is extended or adjusted under 35 U.S.C. 154(b) by 49 days.

This patent is subject to a terminal disclaimer.

(21) Appl. No.: 16/104,043

(22) Filed: Aug. 16, 2018

(65) Prior Publication Data

US 2019/0055356 A1    Feb. 21, 2019

(30) Foreign Application Priority Data

Aug. 18, 2017  (EP) .................... 17186923

(51) Int. Cl.
| | | |
|---|---|---|
| *C08G 69/32* | (2006.01) | |
| *C08J 5/18* | (2006.01) | |
| *C08K 7/14* | (2006.01) | |
| *C08K 3/40* | (2006.01) | |
| *B32B 27/34* | (2006.01) | |
| *C08G 69/26* | (2006.01) | |
| *C08G 69/36* | (2006.01) | |
| *C08L 77/06* | (2006.01) | |
| *B29K 509/08* | (2006.01) | |
| *B29C 45/14* | (2006.01) | |
| *B29K 677/00* | (2006.01) | |
| *B29K 77/00* | (2006.01) | |
| *B32B 27/08* | (2006.01) | |

(52) U.S. Cl.
CPC .............. *C08G 69/32* (2013.01); *B32B 27/34* (2013.01); *C08G 69/265* (2013.01); *C08G 69/36* (2013.01); *C08J 5/18* (2013.01); *C08K 3/40* (2013.01); *C08K 7/14* (2013.01); *C08L 77/06* (2013.01); *B29C 45/14508* (2013.01); *B29K 2077/00* (2013.01); *B29K 2509/08* (2013.01); *B29K 2677/00* (2013.01); *B32B 27/08* (2013.01); *C08J 2377/10* (2013.01); *C08L 2205/025* (2013.01)

(58) Field of Classification Search
CPC ...... C08G 69/32; C08G 69/265; C08G 69/36; B32B 27/34; C08J 5/18; C08K 3/40; C08K 7/14; C08L 77/06

See application file for complete search history.

(56) References Cited

U.S. PATENT DOCUMENTS

| | | |
|---|---|---|
| 6,482,889 B1 | 11/2002 | Kurz |
| 7,723,411 B2 | 5/2010 | Schneider |
| 7,973,191 B2 | 7/2011 | Döring et al. |
| 8,022,170 B2 | 9/2011 | Hoffman et al. |
| 8,268,956 B2 | 9/2012 | Bühler et al. |
| 8,383,244 B2 | 2/2013 | Bayer et al. |
| 8,404,323 B2 | 3/2013 | Pfleghar et al. |
| 8,586,662 B2 | 11/2013 | Harder et al. |
| 8,604,120 B2 | 12/2013 | Stoppelmann et al. |
| 8,993,662 B2 | 3/2015 | Harder |
| 9,109,115 B2 | 8/2015 | Bühler |
| 9,133,322 B2 | 9/2015 | Roth et al. |
| 9,359,532 B2 | 6/2016 | Kaplan |
| 9,453,106 B2 | 9/2016 | Bühler |
| 9,644,081 B2 | 5/2017 | Aepli et al. |
| 9,663,655 B2 | 5/2017 | Aepli et al. |
| 9,815,967 B2 | 11/2017 | Harder et al. |
| 9,963,547 B2 | 5/2018 | Hoppe et al. |
| 9,963,591 B2 | 5/2018 | Bayer et al. |
| 9,969,882 B2 | 5/2018 | Thomas et al. |
| 2006/0235190 A1 | 10/2006 | Hoffman et al. |
| 2007/0249789 A1* | 10/2007 | Buehler ............... C08L 77/00 525/420 |
| 2008/0135720 A1 | 6/2008 | Bühler et al. |
| 2008/0167415 A1* | 7/2008 | Stoeppelmann ........ C08L 77/00 524/494 |
| 2008/0300347 A1 | 12/2008 | Kurz et al. |

(Continued)

FOREIGN PATENT DOCUMENTS

| | | |
|---|---|---|
| EP | 2 169 008 A1 | 3/2010 |
| WO | WO 2015/132510 A1 | 9/2015 |

OTHER PUBLICATIONS

European Patent Office, Extended European Search Report in European Patent Application No. 17186923.3 (dated Feb. 21, 2018).

(Continued)

Primary Examiner — John E Uselding
(74) Attorney, Agent, or Firm — Leydig, Voit & Mayer, Ltd.

(57) ABSTRACT

The present invention relates to a polyamide molding compound comprising the following components or consisting of these components: (A) 40 to 95 wt % of a specific polyamide mixture consisting of the polyamides (A1) and (A2); (B) 5 to 50 wt % of at least one glass filler having a refractive index in the range from 1.540 to 1.600; (C) 0 to 10 wt % of at least one additive; wherein the weight proportions of the components (A) to (C) add up to 100% wt %; wherein the at least one transparent polyamide (A2) has a transparency of at least 90% and a haze of at most 3%. The present invention additionally relates to molded bodies composed of this polyamide molding compound.

17 Claims, No Drawings

(56) References Cited

U.S. PATENT DOCUMENTS

| | | |
|---|---|---|
| 2009/0131569 A1* | 5/2009 | Schwitter .............. C08L 77/00 524/423 |
| 2010/0069657 A1 | 3/2010 | Döring et al. |
| 2010/0168423 A1 | 7/2010 | Döring et al. |
| 2010/0279111 A1 | 11/2010 | Harder et al. |
| 2011/0040023 A1* | 2/2011 | Buhler .............. B29C 48/05 524/538 |
| 2011/0105697 A1* | 5/2011 | Buhler .............. C08G 69/265 525/432 |
| 2011/0220667 A1 | 9/2011 | Pfleghar et al. |
| 2012/0029133 A1 | 2/2012 | Stöppelmann et al. |
| 2012/0115993 A1 | 5/2012 | Kaplan |
| 2012/0237708 A1 | 9/2012 | Caviezel et al. |
| 2012/0321829 A1 | 12/2012 | Bayer et al. |
| 2013/0217807 A1* | 8/2013 | McGinnis .............. C03C 3/062 523/458 |
| 2013/0317168 A1 | 11/2013 | Bühler |
| 2014/0094548 A1 | 4/2014 | Roth et al. |
| 2014/0135458 A1 | 5/2014 | Kaplan |
| 2014/0171573 A1 | 6/2014 | Bayer et al. |
| 2014/0272227 A1 | 9/2014 | Jeltsch et al. |
| 2014/0275392 A1 | 9/2014 | Buhler |
| 2015/0011688 A1* | 1/2015 | An .............. C08K 7/14 524/116 |
| 2015/0051343 A1 | 2/2015 | Kaplan |
| 2015/0104638 A1 | 4/2015 | Jeltsch et al. |
| 2015/0126635 A1 | 5/2015 | Liedloff et al. |
| 2015/0126701 A1 | 5/2015 | Liedloff et al. |
| 2015/0218374 A1 | 8/2015 | Thomas et al. |
| 2015/0284531 A1 | 10/2015 | Aepli et al. |
| 2015/0291795 A1 | 10/2015 | Aepli |
| 2015/0352765 A1 | 12/2015 | Hoffmann et al. |
| 2015/0368398 A1 | 12/2015 | Hoppe et al. |
| 2016/0121575 A1* | 5/2016 | Higuchi .............. C08J 7/0427 442/180 |
| 2016/0130439 A1 | 5/2016 | Koch et al. |
| 2016/0264542 A1 | 9/2016 | Giles |
| 2016/0280914 A1 | 9/2016 | Thomas et al. |
| 2016/0297123 A1 | 10/2016 | Weis et al. |
| 2016/0369098 A1 | 12/2016 | Yasuda et al. |
| 2016/0376423 A1 | 12/2016 | Harder et al. |
| 2017/0058123 A1 | 3/2017 | Sütterlin et al. |
| 2017/0107326 A1 | 4/2017 | Bayer et al. |
| 2017/0137608 A1 | 5/2017 | Stöppelmann |
| 2017/0137609 A1 | 5/2017 | Stöppelmann |
| 2017/0183140 A1 | 6/2017 | Sötterlin et al. |
| 2017/0225414 A1 | 8/2017 | Cheung |
| 2018/0022900 A1 | 1/2018 | Nakano et al. |
| 2018/0100064 A1 | 4/2018 | Aepli et al. |
| 2018/0112059 A1 | 4/2018 | Fujii et al. |
| 2018/0155545 A1 | 6/2018 | Stöppelmann et al. |
| 2018/0171141 A1 | 6/2018 | Thomas et al. |
| 2018/0251599 A1 | 9/2018 | Hoffmann et al. |
| 2018/0251600 A1 | 9/2018 | Aepli et al. |

OTHER PUBLICATIONS

U.S. Appl. No. 10/536,494, filed May 24, 2005.
U.S. Appl. No. 10/553,259, filed Jul. 24, 2006.
U.S. Appl. No. 11/950,964, filed Dec. 5, 2007.
U.S. Appl. No. 12/743,097, filed Nov. 12, 2008.
U.S. Appl. No. 13/045,682, filed Mar. 11, 2011.
U.S. Appl. No. 13/186,785, filed Jul. 20, 2011.
U.S. Appl. No. 13/481,451, filed May 25, 2012.
U.S. Appl. No. 13/800,102, filed Mar. 13, 2013.
U.S. Appl. No. 13/898,099, filed May 20, 2013.
U.S. Appl. No. 13/971,376, filed Aug. 20, 2013.
U.S. Appl. No. 14/205,667, filed Mar. 12, 2014.
U.S. Appl. No. 14/607,676, filed Jan. 28, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
U.S. Appl. No. 14/740,736, filed Jun. 16, 2015.
U.S. Appl. No. 14/915,031, filed Feb. 26, 2016.
U.S. Appl. No. 14/935,642, filed Nov. 9, 2015.
U.S. Appl. No. 15/090,881, filed Apr. 5, 2016.
U.S. Appl. No. 15/105,011, filed Sep. 6, 2016.
U.S. Appl. No. 15/253,506, filed Aug. 31, 2016.
U.S. Appl. No. 15/285,947, filed Oct. 5, 2016.
U.S. Appl. No. 15/349,636, filed Nov. 11, 2016.
U.S. Appl. No. 15/349,729, filed Nov. 11, 2016.
U.S. Appl. No. 15/385,432, filed Dec. 20, 2016.
U.S. Appl. No. 15/385,519, filed Dec. 20, 2016.
U.S. Appl. No. 15/546,373, filed Jul. 26, 2017.
U.S. Appl. No. 15/729,321, filed Oct. 10, 2017.
U.S. Appl. No. 15/789,069, filed Oct. 20, 2017.
U.S. Appl. No. 15/826,177, filed Nov. 29, 2017.
U.S. Appl. No. 15/895,537, filed Feb. 13, 2018.
U.S. Appl. No. 15/910,877, filed Mar. 2, 2018.
U.S. Appl. No. 15/910,891, filed Mar. 2, 2018.
U.S. Appl. No. 15/955,737, filed Apr. 18, 2018.
U.S. Appl. No. 16/104,028, filed Aug. 16, 2018.
U.S. Appl. No. 16/104,035, filed Aug. 16, 2018.
U.S. Appl. No. 16/115,055, filed Aug. 28, 2018.

* cited by examiner

REINFORCED POLYAMIDE MOLDING COMPOUNDS HAVING LOW HAZE AND MOLDED BODIES THEREFROM

CROSS-REFERENCE TO A RELATED APPLICATION

This patent application claims the benefit of European Patent Application No. 17 186 923.3, filed on Aug. 18, 2017, the disclosure of which is incorporated herein by reference in its entirety for all purposes.

The present invention relates to polyamide molding compounds having low haze filled with glass, to molded bodies manufactured therefrom, and to use of same.

Due to their very good optical and mechanical characteristics, the use of amorphous or microcrystalline polyamide molding compounds is very widespread for optical applications in the fields of automotive parts, electronics, optical components, shields, housings, visible surfaces, etc. Blends of amorphous or microcrystalline polyamides and semi-crystalline polyamides can also be used for these applications. The admixture of semi-crystalline polyamides to amorphous polyamides in many cases produces an improvement in toughness, in particular in impact resistance.

In order in particular to increase properties such as the stiffness, strength, deformation reduction, and surface scratch resistance, fibrous or particulate glass fillers can be admixed to the molding compounds. As a rule, a deterioration of the optical properties, in particular of the haze and of the transparency, is observed in this process.

The approach widespread in the prior art for suppressing a deterioration of the optical properties is the adaptation of the refractive index of the glass to that of the polymer. A glass is proposed for this purpose in EP 2 169 008 A1 whose ranges of network formers, network modifiers, and intermediate oxides can be selected as so wide that the refractive index can be set in the range from 1.510 to 1.540, measured at a wavelength of 589 nm (nD). The document further describes that the refractive index to be set for the glass on the addition of the filler to the polymer should not deviate by more than 0.002 from that of the polymer.

WO 2015/132510 A1 likewise relates to transparent polyamide molding compounds reinforced with glass fillers. At least one semi-crystalline polyamide is introduced into the polyamide molding compound to set the refractive index of the molding compounds otherwise on the basis of amorphous polyamides. The polyamide molding compounds in accordance with the claims worked in the examples have glass transition temperatures of a maximum of 135° C. Higher glass transition temperatures were evidently not desired since in the discussion of the prior art problems in the processing of molding compounds, in particular with a material removal, having glass temperatures of >150° C. formed the subject matter.

The prior art has substantial disadvantages that should be improved by the present invention. The preparation of a glass having the accuracy of a refractive index of 0.002 thus requires a substantial technical effort with respect to a glass composition that is as exact as possible, with respect to the raw material purity, with respect to an exact melt homogeneity, and with respect to the temperature regime to be used in the glass manufacture since these factors have an influence on the refractive index of the glass. Such an effort is hardly economically sensible for glasses that only serve as material for fillers and that should be produced as inexpensively as possible if a new glass has to be prepared in each case for a specific polyamide having a specific refractive index.

Depending on the demands of a given application, there is frequently the need to vary the components of a polymer matrix to achieve a specific property profile. As a rule, however, the refractive index of the polymer thereby changes, whereby a respective glass adapted thereto would have to be prepared with the described effort to obtain reinforced molding compounds having good optical properties.

There is therefore a need to be able to modify a matrix polymer with a small effort such that it maintains good optical properties, in particular haze and transparency, despite the incorporation of a glass filler.

The present invention pursues the object of providing a polyamide molding compound reinforced with a glass filler on the basis of transparent polyamides having a relatively high refractive index, in particular in the range from 1.540 to 1.600. In this respect, the polyamide molding compound should have good transparency and a low haze value with simultaneously good mechanical properties. It was equally an object of the present invention to provide polyamide molding compounds having high heat deflection without the processing properties being degraded.

This object is satisfied by the polyamide molding compounds that comprise or consist of the following components:
(A) 40 to 95 wt % of a polyamide mixture consisting of the polyamides (A1) and (A2), wherein
  (A1) 42 to 68 wt % of at least one semi-crystalline polyamide is selected from the group comprising PA 46, PA 66, PA 66/6, PA 610, PA 612, PA 614, PA 615, PA 616, and mixtures thereof; and
  (A2) 32-58 wt % of at least one transparent semi-aromatic polyamide having at least 30 mol % of monomers having aromatic structural units, with respect to the total quantity of diamines and dicarboxylic acids is in the polyamide (A2) that is amorphous or microcrystalline;
(B) 5 to 50 wt % of at least one glass filler having a refractive index in the range from 1.540 to 1.600;
(C) 0 to 10 wt % of at least one additive.

The following requirements must be satisfied here:
The parts by weight of the components (A) to (C) add up to 100 wt %.
The parts by weight of the components (A1) and (A2) add up to 100% of component (A).
The at least one transparent polyamide (A2) has a transparency of at least 90% and a haze of at most 3%.

Advantageous embodiments of the polyamide molding compound in accordance with the invention are also described herein.

The present invention further relates to molded bodies that comprise and preferably consist of the polyamide molding compound in accordance with the invention. These molded bodies are in particular selected from the group comprising components of cellular telephones, tablets, housings of electronic devices, trim parts in vehicles and at home, covers, visible surfaces, backlit components, shields, containers, vehicle keys, and leisure and outdoor articles.

Preferred embodiments of these molded bodies are also described herein.

Definitions of Terms

Notation and Abbreviations for Polyamides and their Monomers

In the sense of the present invention, the term "polyamide" (abbreviation PA) is understood as an umbrella term; it comprises homopolyamides and copolyamides. The selected notations and abbreviations for polyamides and their monomers correspond to those set forth in the ISO standard 16396-1 (2015(D)). The abbreviations used there are used as synonyms to the IUPAC names of the monomers in the following; the following abbreviations for monomers in particular occur: MACM for bis(4-amino-3-methylcyclohexyl)methane (also called 3,3'-dimethyl-4,4'-diaminodicyclohexylmethane), CAS #6864-37-5); PACM for bis(4-aminocyclohexyl)methane (also called 4,4'-diaminodicyclohexylmethane, CAS #1761-71-3); TMDC for bis-(4-amino-3,5-dimethylcyclohexyl)methane (also called 3,3',5,'-tetramethyl-4,4'-diaminodicyclohexylmethane); CAS #65962-45-0); T for terephthalic acid (CAS #100-21-0); I for isophthalic acid CAS #121-95-5); BAC for 1,4-bis(aminomethyl)-cyclohexane (CAS #2549-93-1).

Indications of Quantity

The polyamide molding compounds in accordance with the present invention comprise the components (A) to (C) or preferably exclusively consist of the components (A) to (C); the requirement applies here that the components (A) to (C) add up to 100 wt % in sum. The fixed ranges of the indications of quantity for the individual components (A) to (C) are to be understood such than an arbitrary quantity for each of the individual components can be selected within the specified ranges provided that the strict provision is satisfied that the sum of all the components (A) to (C) produces 100 wt %.

Amorphous or Microcrystalline Polyamides

Amorphous or microcrystalline polyamides preferably display a melting heat of a maximum of 25 J/g, particularly preferably of a maximum of 22 J/g, very particularly preferably of 0 to 20 J/g at a heating rate of 20 K/min in dynamic differential scanning calorimetry (DSC) in accordance with ISO 11357 (2013).

Microcrystalline polyamides also have a melting point in addition to a glass transition temperature. However, they have a morphology in which the crystallites have such a small dimension that a plate manufactured therefrom is still transparent at a thickness of 2 mm, i.e. its light transmission amounts to at least 90% and its haze to at most 3%, measured in accordance with ASTM D 1003-13 (2013).

Amorphous polyamides have no melting heat or only very little melting heat or hardly detectable melting heat in comparison with the microcrystalline polyamides. The amorphous polyamides preferably display a melting heat of a maximum of 5 J/g, particularly preferably of a maximum of 3 J/g, very particularly preferably of 0 to 1 J/g at a heating rate of 20 K/min in dynamic differential scanning calorimetry (DSC) in accordance with ISO 11357 (2013).

Amorphous polyamides have no melting point due to their amorphicity.

Semi-Crystalline Polyamides

In the sense of the invention, semi-crystalline polyamides are those polyamides that preferably display a melting heat of more than 25 J/g, particularly preferably of at least 35 J/g, very particularly preferably of at least 40 J/g at a heating rate of 20 K/min in dynamic differential scanning calorimetry (DSC) in accordance with ISO 11357 (2013). A plate manufactured from semi-crystalline polyamides and having a thickness of 2 mm is not transparent, i.e. its light transmission is below 90% and/or its haze is above 3%, measured in each case in accordance with ASTM D 1003-13 (2013).

Transparent Polyamides

In the sense of the present invention a polyamide is transparent when its light transmission measured according to ASTM D 1003-13 (2013) at plates having a thickness of 2 mm amounts to at least 90% and when its haze amounts to at most 3%. If transparent polyamides are spoken of in the following, it is always amorphous or microcrystalline polyamides that are meant that satisfy the above definition with respect to transparency and melting heat.

Haze, Transparency

The haze describes the scattering behavior of a substance; the transparency the light transmission through the substance. Within the framework of the present invention, the haze or transparency is understood as the haze or transparency (total transmission) measured in accordance with ASTM D1003 on a measuring device Haze Gard Plus of the company BYK Gardner with CIE light type C at 23° C. at a molded body manufactured from the polyamide molding compound (plates of 2 mm thickness with a width and length: 60×60 mm).

Refractive Index

The refractive index is abbreviated in the formulas and in the experimental part by "n". The refractive index is always specified with respect to the glass filler, in particular glass fibers, measured at a wavelength of 589 nm. The determination of the refractive index of glass fillers, in particular of glass fibers, took place using the Beck's line method and using immersion fluids with respect to 589 nm based on method B of ISO 489 (1999-04). The refractive index of the polyamides (A1) and (A2) was determined at plates of a 2 mm thickness (60×60×2 mm) at a wavelength of 589 nm and at 23° C. by means of an Abbe refractometer of Carl Zeiss in accordance with method A of ISO 489 (1999-04). 1-bromonaphthalene was used as the contact fluid.

Component (A)

The polyamide molding compound in accordance with the invention comprises 40 to 95 wt % of component (A), with respect to the sum of the components (A) to (C), with it being a mixture consisting of the polyamides (A1) and (A2). The parts by weight of the components (A1) and (A2) add up to 100% of component (A). (A1) is here at least one semi-crystalline, aliphatic polyamide selected from the group comprising PA 46, PA 66, PA 66/6, PA 610, PA 612, PA 614, PA 615, PA 616, and mixtures thereof.

Polyamide (A2) is at least one transparent, semi-aromatic polyamide having at least 30 mol % of monomers having aromatic structural units, related to the total quantity of diamines and dicarboxylic acids in the polyamide (A2) and is amorphous or microcrystalline. The polyamide (A2) is in particular amorphous.

The specification further applies that the transparent polyamide (A2) has a transparency of at least 90% and a haze of at most 3%.

Preferred embodiments of component (A) will be discussed in the following.

In accordance with a preferred embodiment of the present invention, the aliphatic polyamides (A1) are selected from the group comprising PA 66, PA610, PA 612, PA 616, and mixtures thereof. These polyamides correspond to the preceding definition for semi-crystalline polyamides.

The polyamides of the component (A1) preferably have a relative viscosity, measured in accordance with ISO 307 (2007) in a solution of 0.5 g polymer in 100 ml m-cresol at 20° C., in the range from 1.50 to 2.80, particularly preferably from 1.60 to 2.40, and in particular preferably from 1.70 to 2.20.

In accordance with a further preferred embodiment of the present invention, the component (A1) has a melting temperature determined in accordance with ISO 11357-3 of at least 180° C., particularly preferably in the range from 200 to 300° C., and very particularly preferably in the range from 210° C. to 270° C.

PA 66, PA 610, PA 612 are particularly preferred and PA 66 is in particular preferred among the semi-crystalline, aliphatic polyamides (A1).

In accordance with a preferred embodiment of the present invention, component (A2) is amorphous.

In accordance with a preferred embodiment of the present invention, the proportion of component (A) in the polyamide molding compound is in the range from 49 to 90 wt %, preferably from 50 to 90 wt %, particularly preferably from 55 to 89.9 wt %, and in particular preferably 67 to 84.9 wt %, in each case with respect to the sum of components (A) to (C).

Another preferred embodiment of the invention provides that the polyamide mixture (A) comprises 45 to 65 wt %, preferably 48 to 63 wt % polyamide (A1) and 35 to 55 wt %, particularly preferably 37 to 52 wt % of polyamide (A2). The weight specification of components (A1) and (A2) add up to 100% of component (A).

A further preferred embodiment of the present invention provides that the monomers having aromatic structural units for the transparent polyamide (A2) is from the group comprising terephthalic acid, isophthalic acid, naphthalenedicarboxylic acid (NDA), in particular 1,5-naphthalenedicarboxylic acid and 2,6-naphthalenedicarboxylic add, biphenyldicarboxylic acid, in particular biphenyl-2,2'-dicarboxylic acid, 4,4'-diphenyldicarboxylic acid, 3,3'-diphenyldicarboxylic acid, 4,4'-diphenyl ether dicarboxylic acid, 4,4'-diphenylmethanedicarboxylic acid, and 4,4-diphenylsulfonedicarboxylic acid, 1,5-anthracene dicarboxylic acid, p-terphenylene-4,4'-dicarboxylic acid, and 2,5-pyridine dicarboxylic acid, xylylenediamine, in particular meta-xylylenediamine, and para-xylylenediamine, and mixtures thereof.

The monomers having aromatic structures for the transparent polyamides (A2) are particularly preferably selected solely from the group comprising terephthalic acid, isophthalic acid, 1,5-naphthalenedicarboxylic acid, and 2,6-naphthalenedicarboxylic acid.

In accordance with a further preferred embodiment of the present invention, the transparent polyamides (A2) are made up of the following monomers:
- (a-A2) 0 to 100 mol % of cycloaliphatic diamines, with respect to the total quantity of diamines;
- (b-A2) 0 to 100 mol % of diamines having aromatic structural units, with respect to the total quantity of diamines;
- (cA-2) 0 to 100 mol % of open-chain, aliphatic diamines, preferably having 6 to 10 carbon atoms, in particular having 6 carbon atoms, with respect to the total quantity of diamines;
- (d-A2) 0 to 70 mol % of open-chain aliphatic dicarboxylic acids, with respect to the total quantity of dicarboxylic acids;
- (e-A2) 30 to 100 mol % of aromatic dicarboxylic acids, with respect to the total quantity of dicarboxylic acids;
- (f-A2) 0 to 70 mol % of cycloaliphatic dicarboxylic acids, with respect to the total quantity of dicarboxylic acids;
- (g-A2) 0 to 40 wt % of lactams and/or aminocarboxylic acids having 6 to 12 carbon atoms, with respect to the total quantity of the monomers (a-A2) to (g-A2), where the sum of the diamines (a-A2), (b-A2), and (c-A2) produces 100 mol %; where the sum of the dicarboxylic acids (d-A2), (e-A2), and (f-A2) produces 100 mol %; and where the sum of the monomers (b-A2) and (e-A2) amounts to at least 30 mol %, with respect to the sum of the total diamines and of the total dicarboxylic acids in the polyamide (A2). The content of aromatic dicarboxylic acids (e-A2) is particularly preferably in the range from 60 to 100 mol %; the content of open-chain, aliphatic dicarboxylic acids (d-A2) in the range from 0 to 40 mol %; and the content of cycloaliphatic dicarboxylic acids (f-A2) in the range from 0 to 40 mol %, in each case with respect to the total quantity of dicarboxylic acids. Very particularly preferably, (A2) is free of cycloaliphatic dicarboxylic acids (f-A2). Further preferably the content of cycloaliphatic diamines (a-A2) is in the range from 0 to 50 mol %, in particular in the range from 10-40 mol %; the content of the open chain, aliphatic diamines (C-A2) is in the range from 50 to 100 mol %, in particular 60 to 90 mol %; and the content of cycloaliphatic diamines (b-A2) is in the range from 0 to 50 mol %, in particular in the range from 0 to 30 mol %, in each case with respect to the total quantity of diamines. Very particularly preferably, (A2) is free of diamines (b-A2). (A2) is furthermore preferably free of lactams and aminocarboxylic acids (g-A2), in particular free of aminoundecanoic acid.

In accordance with another preferred embodiment of the present invention, the transparent polyamide (A2) comprises at least 35 mol %, preferably at least 40 mol %, particularly preferably in the range from 30 to 100 mol %, 35 to 80 mol %, or 40 to 60 mol % of monomers having aromatic structural units, with respect to the total quantity of diamines and dicarboxylic acids in the polyamide (A2).

Another preferred embodiment of the invention provides that the polyamide molding compound comprises exactly one polyamide (A1). In accordance with a further preferred embodiment of the present invention, the polyamide molding compound comprises exactly one polyamide (A2). It is particularly preferred that the polyamide molding compound comprises exactly one polyamide (A1) and exactly one polyamide (A2).

Another preferred embodiment of the invention provides that the cycloaliphatic diamine (a-A2) is selected from the group comprising bis(4-amino-3-methylcyclohexyl)methane (MACM), bis-(4-aminocylcohexyl)methane (PACM), bis-(4-amino-3-ethylcyclohexyl)methane, bis-(4-amino-3,5,-dimethylcyclohexyl)methane, 2,6,norbornane diamine (2,6-bis-(aminomethyl)norbornane), 1,3-diaminocyclohexane, 1,4-diaminocyclohexanediamine, isophorone diamine, 1,3-bis-(aminomethyl)cyclohexane, 1,4-bis-(aminomethyl)cyclohexane, 2,2-(4,4'-diaminodicyclohexyl)propane, and mixtures thereof.

The cycloaliphatic diamines (a-A2) are particularly preferably selected from the group comprising bis-(4-amino-3-methylcyclohexyl)methane (MACM) and bis-(4-aminocylcohexyl)methane (PACM), and mixtures thereof.

In accordance with another preferred embodiment of the present invention, the aromatic diamine (b-A2) is selected from the group comprising xylylenediamine, in particular meta-xylylenediamine, and para-xylylendediamine, and mixtures thereof.

The diamine having aromatic structural units (b-A2) is particularly preferably selected as meta-xylylenediamine.

In accordance with another preferred embodiment, the diamine (c-A2) is selected from the group comprising 1,4-butanediamine, 1,5-pentanediamine, 2-methyl-1,5-pentanediamine, hexanediamine, in particular 1,6-hexanediamine, 2,2,4-trimethyl-1,6-hexamethylenediamine, 2,4,4-trimethyl-1,6-hexamethylenediamine, nonanediamine, in particular 1,9-nonanediamine, 2-methyl-1,8-octanediamine, 1,10-decanediamine, 1,11-undecanediamine, 1,12-dodecanediamine, 1,13-tridecanediamine, 1,14-tetradecanediamine, 1,18-octadecanediamine, and mixtures thereof.

The open-chain, aliphatic diamines (c-A2) are particularly preferably selected from the group comprising diamines having 6 to 12 carbon atoms, in particular 1,6-hexanediamine, 1,9-nonanediamine, 1,10-decanediamine, and mixtures thereof.

A further preferred embodiment of the present invention provides that the aliphatic dicarboxylic acid (d-A2) is selected from the group comprising 1,6-apidic acid, 1,9-nonanedioic acid, 1,10-decanedioic acid, 1,11-undecanedioic acid, 1,12 dodecanedioic acid, 1,13-tridecanedioic acid, 1,14-tetradecanedioic acid, 1,16-hexadecanedioic acid, 1,18-octadecanedioic acid, and mixtures thereof.

The open-chain, aliphatic dicarboxylic acid (d-A2) is particularly preferably selected from the group comprising dicarboxylic acids having 6 to 12 carbon atoms, in particular 1,6-hexanedioic acid, 1,10-decanedioic acid, 1,12-dodecanedioic acid, and mixtures thereof In accordance with a further preferred embodiment of the present invention, the aromatic dicarboxylic acid (e-A2) is selected from the group comprising terephthalic acid, isophthalic acid, naphthalenedicarboxylic acid (NDA), in particular 1,5-naphthalenedicarboxylic acid and 2,6-naphthalenedicarboxylic add, biphenyldicarboxylic acid, in particular biphenyl-2,2'-dicarboxylic acid, 4,4'-diphenyldicarboxylic acid, 3,3'-diphenyldicarboxylic acid, 4,4'-diphenyl ether dicarboxylic acid, 4,4'-diphenylmethanedicarboxylic acid, and 4,4'-diphenylsulfonedicarboxylic acid, 1,5-anthracene dicarboxylic acid, p-terphenylene-4,4'-dicarboxylic acid, and 2,5-pyridine dicarboxylic acid, and mixtures thereof.

The aromatic dicarboxylic acid (e-A2) is particularly preferably selected from the group comprising terephthalic acid, isophthalic acid, and mixtures thereof.

A further preferred embodiment of the present invention provides that the cycloaliphatic dicarboxylic acid (f-A2) is selected from the group comprising 1,3-cyclopentanedicarboxylic acid, 1,3-cyclohexanedicarboxylic acid, 1,4-cyclohexanedicarboxylic acid, 2,3-norbornanedicarboxylic acid, 2,6-norbornanedicarboxylic acid, and mixtures thereof.

The cycloaliphatic dicarboxylic acid (f-A2) is particularly preferably selected from the group comprising 1,3-cyclohexanedicarboxylic acid and 1,4-cyclohexanedicarboxylic acid and mixtures thereof.

In accordance with a further preferred embodiment of the present invention, the lactam and/or the α,ω-aminocarboxylic acids (g-A2) is/are selected from the group comprising m-aminobenzoic acid, p-aminobenzoic acid, caprolactam (CL), α,ω-aminocaproic acid, α,ω-aminoheptanoic acid, α,ω-aminooctanoic acid, α,ω-aminononanoic acid, α,ω-aminodecanoic acid, α,ω-aminoundecanoic acid (AUA), laurolactam (LL), and α,ω-aminododecanoic acid (ADA); caprolactam, α,ω-aminocaproic acid, laurolactam, α,ω-aminodecanoic acid, and α,ω-aminododecanoic acid, and mixtures thereof are particularly preferred.

The lactams and/or aminocarboxylic acids (g-A2) are preferably selected from the group comprising caprolactam, aminocaproic acid, aminoundecanoic acid, laurolactam, and aminododecanoic acid, and mixtures thereof.

A further preferred embodiment of the present invention provides that the cycloaliphatic diamine (a-A2) is selected from the group comprising bis-(4-amino-3-methylcyclohexyl)methane, bis-(4-aminocylcohexyl)methane, bis-(4-amino-3-ethylcyclohexyl)methane, bis-(4-amino-3,5,-dimethylcyclohexyl)methane, 2,6-norbornane diamine, 1,3-diaminocyclohexane, 1,4-diaminocyclohexanediamine, isophorone diamine, 1,3-bis-(aminomethyl)cyclohexane, 1,4-bis-(aminomethyl)cyclohexane, 2,2-(4,4'-diaminodicyclohexyl)propane, and mixtures thereof, and the aromatic diamine (b-A2) is selected from the group comprising xylylenediamine, in particular meta-xylylenediamine and para-xylylenediamine, and mixtures thereof, and the diamine (c-A2) is selected from the group comprising hexanediamine, in particular 1,6-hexanediamine, nonanediamine, in particular 1,9-nonanediamine, 1,10-decanediamine, 1,11-undecanediamine, 1,12-dodecanediamine, 1,13-tridecanediamine, 1,14-tetradecanediamine, 1,18-octadecanediamine, and mixtures thereof, and the aliphatic dicarboxylic acid (d-A2) is selected from the group comprising 1,6-hexanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,16-hexadecanedioic acid, 1,18-octadecanedioic acid, and mixtures thereof, and the aromatic dicarboxylic acid (e-A2) is selected from the group comprising terephthalic acid, isopthalic acid, naphthalenedicarboxylic acid (NDA), in particular 1,5-naphthalenedicarboxylic acid and 2,6-naphthalenedicarboxylic acid, biphenyldicarboxylic acids, in particular biphenyl-2,2'-dicarboxylic acid, 4,4'-diphenyldicarboxylic acid, 3,3'-diphenyldicarboxylic acid, 4,4'-diphenyl ether dicarboxylic acid, 4,4'-diphenylmethanedicarboxylic acid, and 4,4'-diphenylsulfonedicarboxylic acid, 1,5-anthracenedicarboxylic acid, p-terphenylene-4,4''-dicarboxylic acid, and 2,5-pyridinedicarboxylic acid, and mixtures thereof, and the cycloaliphatic dicarboxylic acid (f-A2) is selected from the group comprising 1,3-cyclohexanedicarboxylic acid, 1,4-cyclohexanedicarboxylic acid, and mixtures thereof, and the lactam and/or the α,ω-aminocarboxylic acids (g-A2) is/are selected from the group comprising m-aminobenzoic acid, p-aminobenzoic acid caprolactam (CL), α,ω-aminocaproic acid, α,ω-aminoheptanoic acid, α,ω-aminooctanoic acid, α,ω-aminononanoic acid, α,ω-aminodecanoic acid, α,ω-aminoundecanoic acid (AUA), laurolactam (LL), and α,ω-aminododecanoic acid (ADA); caprolactam, α,ω-aminocaproic acid, laurolactam, α,ω-aminodecanoic acid, and α,ω-aminododecanoic acid, and mixtures thereof are particularly preferred.

The cycloaliphatic diamines (a-A2) are particularly preferably selected from the group comprising bis-(4-amino-3-methylcyclohexyl)methane (MACM) and bis(4-aminocyclohexyl)methane (PACM) and mixtures thereof and the diamines having aromatic structural units (b-A2) are selected from the group comprising meta-xylylenediamine and para-xylylenediamine and mixtures thereof, and the open-chain, aliphatic diamines (c-A2) are selected from the group comprising diamines having 6 to 10 carbon atoms, in particular 1,6-hexanediamine, 1,9-nonanediamine, 1,10-decanediamine, and mixtures thereof, and the open-chain aliphatic dicarboxylic acids (d-A2) are selected from the group comprising dicarboxylic acids having 6 to 12 carbon atoms, in particular 1,6-hexanedioic acid, 1,10-decanedioic acid, 1,12-dodecanedioic acid, and mixtures thereof, and the aromatic dicarboxylic acids (e-A2) are selected from the group comprising terephthalic acid, isophthalic acid, and mixtures thereof, and the cycloaliphatic dicarboxylic acids (f-A2) are selected from the group comprising 1,3-cyclohexanedicarboxylic acid and 1,4-cyclohexanedicarboxylic acid, and mixtures thereof, and the lactams and/or aminocarboxylic acids (g-A2) are selected from the group comprising caprolactam, aminocaproic acid, aminoundecanoic acid, laurolactam, and aminododecanoic acid, and mixtures thereof.

In accordance with a further preferred embodiment of the present invention, the polyamide (A2) is selected from the group comprising PA 6I/6T, PA 10I/10T, PA DI/DT (D=2-Methyl-1,5-pentandiamin), PA MACMI/12, PA MACMI/1012, PA MACMT/12, PA MACMI/MACMT/12, PA MACMI/MACMT, PA MACMI/MACMT/MACM12, PA 6I/6T/MACMI/MACMT, PA 6I/6T/MACMI/MACMT/12, PA 6I/MACMI, PA 6I/6T/PACMI/PACMT, PA 6I/612/MACMI/MACM12, PA 6T/612/MACMT/MACM12, PA 6I/6T/612/MACMI/MACMT/MACM12, PA 6I/6T/MACMI/MACMT/PACMI/PACMT, PA 6I/6T/MACMI/MACMT/PACMI/PACMT/12, PA MACMI/MACMT/MACM36, PA MACMI/MACM36, PA MACMT/MACM36, PA 12/PACMI, PA 12/MACMT, PA 6/PACMT, PA 6/PACMI, PA MXDI, PA MXDI/MXD6, PA MXDI/MXD10, PA MXDI/MXDT, PA MXDI/MACMI, PA MXDI/MXDT/MACMI/MACMT, PA 6I/6T/BACI/BACT, PA MACMI/MACMT/BACI/BACT, PA 6I/6T/MACMI/MACMT/BACI/BACT, and mixtures thereof.

Another preferred embodiment of the present invention provides that component (A2) has a glass transition temperature determined in accordance with ISO 11357-2 of at least 120° C., preferably at least 125° C., particularly preferably 135° C., and in particular preferably 140° C.

In accordance with another preferred embodiment of the present invention, the polyamide (A2) comprises at most 30 wt %, particularly preferably at most 20 wt % of lactams and aminocarboxylic acids; it is in particular free of lactams and aminocarboxylic acids, in particular free of aminoundecanoic acid.

Component (A2) preferably has a relative viscosity, measured in a solution of 0.5 g polymer in 100 ml m-cresol at 20° C., in the range from 1.35 to 2.40, particularly preferably from 1.40 to 1.90, and in particular preferably from 1.42 to 1.80.

Component (B)

The molding compound in accordance with the invention comprises as component (B) at least one glass filler.

The glass filler (B) is included in the polyamide molding compound at 10 to 45 wt % and particularly preferably at 10 to 40 wt % and in particular preferably at 15 to 35 wt % or 15 to 30 wt %, with these indications of quantity relating to the polyamide molding compound resulting at 100% from the components (A), (B), and (C).

The glass filler is preferably selected from the group comprising glass fibers, ground glass fibers, glass particles, glass flakes, glass spheres, hollow glass spheres, or comprising combinations of the aforesaid. Combinations of fillers are preferably only used when the refractive indices do not differ between the filler categories. The at least one glass filler has a refractive index here, measured at a wavelength of 589 nm, of 1.540 to 1.600, preferably of 1.545 to 1.590, in particular of 1.548 to 1.585, or of 1.550 to 1.570.

If glass spheres or glass particles are used as the glass filler (B), their mean diameter amounts to 0.3 to 100 µm, preferably 0.7 to 30 µm, particularly preferably 1 to 10 µm.

A preferred embodiment of the present invention provides that the glass type of the at least one glass filler (B) is selected from the group comprising E-glass, E-CR-glass, R-glass, AR-glass, in particular E-glass, R-glass, and mixtures of glass having substantially the same refractive index. The term "substantially the same refractive index" is understood in that the difference in the refractive index of the glass species forming the mixture is 0.01, preferably 0.005.

A preferred embodiment provides that component (B) has the following composition: 50 to 78 wt %, in particular 52 to 62 wt %, silica, 0 to 30 wt %, in particular 8 to 28 wt %, alumina, 1 to 25 wt %, in particular 8 to 25 wt %, calcium oxide, 0 to 7 wt % magnesium oxide, 0 to 20 wt %, in particular 0 to 3 wt % sodium oxide and potassium oxide, 0 to 10 wt % boron oxide, 0 to 20 wt %, in particular 0 to 5 wt %, further additives such as metal oxides (e.g. lithium oxide, titanium oxide, zinc oxide, zirconia, iron oxide).

Preferred glass fillers in accordance with the present invention are glass fibers.

In accordance with a preferred embodiment, component (B) comprises E-glass fibers and particularly preferably consists thereof. E-glass fibers consist in accordance with ASTM D578-00 of 52 to 62% silica, 12 to 16% alumina, 16 to 25% calcium oxide, 0 to 10% boron oxide, 0 to 5% magnesium oxide, 0 to 2% alkali oxides, 0 to 1.5% titanium dioxide, and 0 to 0.3% iron oxide. E-glass fibers have a density of 2.54 to 2.62 g/cm$^3$, a modulus of elasticity of 70 to 75 GPa, a tensile strength of 3000 to 3500 MPa, and an elongation at break of 4.5 to 4.8%, with the mechanical properties having been determined at single fibers having a diameter of 10 µm and a length of 12.7 mm at 23° C. and at a relative humidity of 50%.

Specific examples for these E-glass fibers are CSG3 from Nittobo, glass fiber ECS from CPIC, or Vetrotex 995 from the Saint-Gobain group.

In accordance with another preferred embodiment, component (B) comprises E-CR glass fibers or particularly preferably consists thereof. E-CR glass fibers consist of 52 to 64 wt %, in particular preferably 54 to 62 wt %, silica, 8 to 18 wt %, in particular preferably 9 to 15 wt % alumina, 15 to 28 wt %, in particular preferably 17 to 25 wt % calcium oxide, 0 to 4 wt % magnesium oxide, 0 to 2 wt % sodium oxide and potassium oxide, 0 to 1 wt % boron oxide, 0 to 10 wt %, in particular preferably 0 to 5, further additives such as metal oxides (e.g. titanium oxide, zinc oxide, iron oxide).

In accordance with another preferred embodiment, component (B) comprises R-glass fibers or particularly preferably consists thereof. R-glass fibers consist of 52 to 64 wt %, in particular preferably 54 to 62 wt %, silica, 8 to 18 wt %, in particular preferably 9 to 15 wt % alumina, 15 to 28 wt %, in particular preferably 17 to 25 wt % calcium oxide, 0 to 4 wt % magnesium oxide, 0 to 2 wt % sodium oxide and potassium oxide, 0 to 1 wt % boron oxide, 0 to 10 wt %, in particular preferably 0 to 5, further additives such as metal oxides (e.g. titanium oxide, zinc oxide, iron oxide).

It is further preferred that component (B) is formed from a mixture of E-glass fibers, E-CR-glass fibers, AR-glass fibers, and R-glass fibers.

Component (B) is particularly preferably a glass fiber that is substantially made up or consists of the components silica, calcium oxide, and alumina and the weight ratio SiO$_2$/(CaO+MgO) is smaller than 2.7, preferably smaller than 2.5, and in particular between 2.1 and 2.4.

The glass fibers preferably have a circular or non-circular cross-sectional area.

Glass fibers having a circular cross-section, that is, round glass fibers, typically have a diameter in the range from 5 to 20 µm, preferably in the range from 6 to 17 µm, and particularly preferably in the range from 6 to 13 µm. They are preferably used as short glass fibers (cut glass product having a length of 0.2 to 20 mm, preferably 2 to 12 mm) or rovings.

With flat glass fibers, that is glass fibers having a non-circular cross-sectional area, they are preferably used with a dimensional ratio of the main cross-sectional axis to the secondary cross-sectional axis perpendicular thereto of more than 2, preferably of 2 to 8, in particular of 2.5 to 5.0. These so-called flat glass fibers have an oval cross-sectional area, an elliptical cross-sectional area, an elliptical cross-sectional surface provided with constriction(s) (so-called "cocoon" fibers), polygonal, rectangular or almost rectangular cross-sectional area.

A further feature of the preferred flat glass fibers is that the length of the main cross-sectional axis preferably lies in the range from 6 to 40 µm, in particular in the range from 15 to 30 µm, and the length of the secondary cross-sectional axis lies in the range from 3 to 20 µm, in particular in the range from 4 to 10 µm. The flat glass fibers here have a packing density that is as high as possible, i.e. the cross-sectional area of the glass fibers fills an imaginary rectangle surrounding the glass fiber cross-section as exactly as possible at at least 70%, preferably at least 80%, and in particular preferably at at least 85%.

The glass fibers are preferably provided with a black wash that is in particular suitable for polyamide, for example comprising a bonding agent on the basis of aminosilane compound or an epoxysilane compound.

The glass fibers of component (B) can be present in the form of short fibers, preferably in the form of cut glass product having a length in the range from 0.2 to 20 mm, or in the form of rovings.

In accordance with an embodiment, the polyamide molding compounds comprise 5 to 50 wt % of a glass fiber (B) that is used in the form of so-called short fibers (e.g. cut glass product having a length of 0.2 to 20 mm) or rovings, with the glass fibers (B) being so-called E-glass fibers having a round cross-section.

Component (C)

The polyamide molding compound in accordance with the invention furthermore comprises from 0 to 10 wt % of the component (C), with respect to the sum of the components (A) to (C).

In accordance with a preferred embodiment of the present invention, the proportion of component (C) in the polyamide molding compound is in the range from 0 to 6 wt %, preferably 0.1 to 5 wt %, and particularly preferably 0.1 to 3.0 wt %, with respect to the sum of he components (A) to (C).

A further preferred embodiment provides that the at least one additive (C) is selected from the group comprising inorganic and organic stabilizers, in particular antioxidants, antiozonants, heat stabilizers, light protection means, UV stabilizers, UV absorbers, or UV blockers, monomers, in particular lactams, plasticizers, impact modifiers, lubricants, colorants, marking means, photochromic agents, demolding means, condensation catalysts, chain regulators, in particular monofunctional carboxylic acids or amines, anti-foaming agents, anti-blocking agents, optical brighteners, non-halogen flame retardants, natural sheet silicates, synthetic sheet silicates, nanoscale fillers having a particle size ($d_{90}$) of a maximum of 100 nm, and mixtures thereof.

The use of additives of component (C) has in particular to be given special attention with respect to the obtaining of a transparency that is as high as possible and a haze that is as low as possible. Only those additives may preferably be introduced into the molding compound that have no negative effects or only small negative effects on the transmission and on the haze of the molding compound. The molding compound in accordance with the invention therefore preferably only comprises the following components (C) selected from the group comprising inorganic and organic stabilizers, in particular antioxidants, antiozonants, heat stabilizers, light protection means, UV stabilizers, UV absorbers or UV blockers, monomers, lubricants, colorants, marking means, demolding means, condensation catalysts, chain regulators, in particular monofunctional carboxylic acids or amines, anti-foaming agents, anti-blocking agents, optical brighteners, in a quantity of preferably 0.1 to 3.0 wt %, with respect to the sum of components (A) to (C).

Polyamide Molding Compound

A preferred embodiment of the present invention provides that the proportion of component (A) in the polyamide molding compound is in the range from 49 to 90 wt %, preferably 50 to 90 wt %, in particular preferably 55 to 89.9 wt %, and particularly preferably 67 to 84.9 wt %, with respect to the sum of the components (A) to (C), and the proportion of component (B) in the polyamide molding compound is in the range from 10 to 45 wt %, preferably 10 to 40 wt %, and particularly preferably 15 to 30 wt %, with respect to the sum of the components (A) to (C), and the proportion of component (C) in the polyamide molding compound is in the range from 0 to 6 wt %, preferably 0.1 to 5 wt %, and particularly preferably 0.1 to 3.0 wt %, with respect to the sum of the components (A) to (C)

Another preferred embodiment of the present invention further provides that the polyamide molding compound does not have any other components than the components (A) to (C).

In accordance with another preferred embodiment of the present invention, the transparency measured in accordance with ASTM D1003 at a molded body (plate with the dimension 60×60×2 mm) produced from the polyamide molding compound amounts to at least 80%, preferably at least 83%, and particularly preferably at least 85%.

In accordance with another preferred embodiment of the present invention, the transparency measured in accordance with ASTM D1003 at a molded body (plate with the dimension 60×60×2 mm) produced from the polyamide molding compound and comprising 20 wt % glass fillers (B), preferably in the form of glass fibers, in particular in the form of E-glass fibers, amounts to at least 83%, preferably at least 85%, and particularly preferably at least 87%.

A further preferred embodiment provides that the haze measured in accordance with ASTM D1003 at a molded body (plate with the dimension 60×60×2 mm) produced from the polyamide molding compound amounts to a maximum of 40%, preferably a maximum of 35%, particularly preferably to a maximum of 30% and very particularly preferably a maximum of 25%.

A further preferred embodiment provides that the haze measured in accordance with ASTM D1003 at a molded body (plate with the dimension 60×60×2 mm) produced from the polyamide molding compound and comprising 20 wt % glass fillers (B), preferably in the form of glass fibers, in particular in the form of E-glass fibers, amounts to a maximum of 30%, preferably a maximum of 25%, particularly preferably a maximum of 20%, and very particularly preferably a maximum of 15%.

In accordance with another preferred embodiment of the present invention, the arithmetical mean roughness Ra determined at a molded body (plate with the dimension 60×60×2 mm) produced from the polyamide molding compound in accordance with DIN EN ISO 4287 (2010-07) by means of a MarSurf XR1 Surface Measuring Station amounts to at most 0.12 µm, preferably at most 0.09 µm, particularly preferably from 0.01 to 0.10 µm, in particular from 0.02 to 0.09 µm, and/or the surface roughness $R_z$ amounts to at most 1.50 µm, preferably at most 1.00 µm, particularly preferably from 0.05 to 1.30 µm, in particular from 0.10 to 1.00 µm.

In accordance with another preferred embodiment of the present invention, the arithmetical mean roughness Ra determined in accordance with DIN EN ISO 4287 (2010-07) at a molded body (plate with the dimension 60×60×2 mm) produced from the polyamide molding compound and comprising 20 wt % glass filler (B), preferably in the form of glass fibers, in particular in the form of E-glass fibers by means of a MarSurf XR1 Surface Measuring Station amounts to at most 0.10 μm, preferably at most 0.07 μm, particularly preferably from 0.01 to 0.08 μm, in particular from 0.02 to 0.07 μm, and/or the surface roughness $R_z$ amounts to at most 1.30 μm, preferably at most 0.90 μm, particularly preferably from 0.05 to 1.00 μm, in particular from 0.10 to 0.90 μm.

In accordance with a further preferred embodiment of the present invention the transparency measured in accordance with ASTM D1003 at a molded body (plate with the dimension 60×60×2 mm) produced from the polyamide molding compound amounts to at least 80%, preferably at least 83%, and particularly preferably at least 85%, and the haze measured in accordance with ASTM D1003 at a molded body (plate with the dimension 60×60×2 mm) produced from the polyamide molding compound amounts to a maximum of 40%, preferably a maximum of 35%, particularly preferably a maximum of 30% and very particularly preferably to a maximum of 25% and the arithmetical mean roughness Ra determined in accordance with DIN EN ISO 4287 (2010-07) at a molded body (plate with the dimension (60×60×2 mm) produced from the polyamide molding compound by means of a MarSurf XR1 Surface Measuring Station amounts to at most 0.12 μm, preferably at most 0.09 μm, particularly preferably from 0.01 to 0.10 μm, in particular from 0.02 to 1.50 μm, and/or the surface roughness $R_z$ amounts to at most 1.50 μm, preferably at most 1.00 μm, particularly preferably from 0.05 to 1.30 μm, in particular from 1.00 to 1.00 μm.

In accordance with a further preferred embodiment of the present invention the transparency measured in accordance with ASTM D1003 at a molded body (plate with the dimension 60×60×2 mm) produced from the polyamide molding compound and comprising 20 wt % glass filler (B), preferably in the form of glass fibers, in particular in the form of E-glass fibers, amounts to at least 83%, preferably at least 85% and particularly preferably at least 87%, and the haze measured in accordance with ASTM D1003 at a molded body (plate with the dimension 60×60×2 mm) produced from the polyamide molding compound and comprising 20 wt % glass filler (B), preferably in the form of glass fibers, in particular in the form of E-glass fibers, amounts to a maximum of 30%, preferably to a maximum of 25%, particularly preferably to a maximum of 20% and very particularly preferably to a maximum of 15%, and the arithmetical mean roughness Ra determined in accordance with DIN EN ISO 4287 (2010-07) at a molded body (plate with the dimension 60×60×2 mm) produced from the polyamide molding compound and comprising 20 wt % glass filler (B), preferably in the form of glass fibers, in particular in the form of E-glass fibers, by means of a MarSurf XR1 Surface Measuring Station amounts to at most 0.10 μm, preferably at most 0.07 μm, particularly preferably from 0.01 to 0.08 μm, in particular from 0.02 to 0.07 μm, and/or the surface roughness $R_z$ amounts to at most 1.30 μm, preferably at most 0.90 μm, particularly preferably from 0.05 to 1.00 μm, in particular from 0.10 to 0.90 μm Another preferred embodiment of the present invention provides that the modulus of elasticity of the polyamide molding compound determined in accordance with ISO 527 is in the range from 3,000 to 18,000 MPa, preferably from 5,000 to 12,000 MPa, and particularly preferably from 6,000 to 10,000 MPa.

In accordance with another preferred embodiment of the present invention, the failure stress of the polyamide molding compound determined in accordance with ISO 527 amounts to from 100 to 270 MPa, preferably to from 120 to 150 MPa, and particularly preferably to from 130 to 180 MPa.

In accordance with a further preferred embodiment of the present invention, the elongation at break of the polyamide molding compound determined in accordance with ISO 527 is greater than 2%, preferably greater than 2.3%, and particularly preferably in the range from 2.4 to 10%.

In accordance with another preferred embodiment of the present invention, the impact resistance of the polyamide molding compound determined in accordance with ISO 179/2 is preferably greater than 30 $kJ/mm^2$, preferably greater than 35 $kJ/mm^2$, and particularly preferably in the range from 35 to 100 $kJ/mm^2$.

In accordance with a further preferred embodiment of the present invention, the notch impact strength of the polyamide molding compound determined in accordance with ISO 179/2 amounts to at least 6 $kJ/mm^2$, preferably to at least 7 $kJ/mm^2$, and particularly preferably from 7 to 15 $kJ/mm^2$.

In accordance with another preferred embodiment of the present invention, the HDT A of the polyamide molding compounds determined in accordance with ISO 75 (2013-04) amounts to at least 180° C., particularly preferably to at least 200° C., and very particularly preferably at least 220° C., and is preferably in the range from 180 to 300° C., particularly preferably from 200 to 280° C., and very particularly preferably from 220 to 270° C.

In accordance with a further preferred embodiment of the present invention, the HDT B of the polyamide molding compounds determined in accordance with ISO 75 (2013-04) amounts to at least 180° C., particularly preferably to at least 200° C., and very particularly preferably at least 220° C., and is preferably in the range from 180 to 300° C., particularly preferably from 200 to 280° C., and very particularly preferably from 220 to 270° C.

In accordance with another preferred embodiment of the present invention, the polyamide molding compound is free of lactams and aminocarboxylic acids, in particular free of aminoundecanoic acid. It is further preferred that the polyamide molding compound is free of polyetheramides.

A preferred polyamide molding compound in accordance with the present invention particularly preferably comprises:
(A) 67 to 84.9 wt % of a mixture (A) of
  48 to 63 wt % polyamide 66 (A1);
  37 to 52% of at least one amorphous, semi-aromatic polyamide (A2) having 35 to 80 mol % of aromatic dicarboxylic acids, in particular terephthalic acid and/or isophthalic acid, with respect to the total quantity of diamines and dicarboxylic acids in the polyamide (A2);
(B) 15 to 30 wt % of at least one glass fiber having a refractive index in the range from 1.55 to 1.57;
(C) 0.1 to 3 wt % of at least one additive,
wherein the following provisions have to be met:
  The parts by weight of the components (A) to (C) add up to 100 wt %.
  The parts by weight of the components (A1) and (A2) add up to 100% of component (A).
  The amorphous polyamide (A2) has a transparency of at least 90% and a haze of at most 3%.

Molded Bodies

The present invention further relates to molded bodies comprising the molding compound as defined above; the molded body preferably consists of this polyamide molding compound. These molded bodies are in particular selected from the group comprising decorative structural frames, control buttons, covers, visible surfaces, backlit components, shields of cellular phones, tablets, housings of electronic devices, trim parts in vehicles, domestic appliances, containers, vehicle keys, leisure and outdoor articles.

In accordance with a preferred embodiment of the present invention, the molded bodies are multilayer. It is in particular a two-layer or three-layer molded body that preferably comprises only one layer formed of the previously described molding compound in accordance with the invention.

It is preferably a multilayer molded body formed from a layer (S1) comprising or consisting the polyamide molding compound in accordance with the invention and at least one further layer (S2), (S3), or (S4) that is free of glass fillers (B) or that has a proportion of glass filler (B) reduced in comparison with the layer (S1), with the glass filler proportion preferably being reduced by at least 50 wt %.

These multilayer molded bodies make possible a good surface quality even with the use of transparent polyamides of a higher viscosity as a component of the mixture (A) and/or the use of molding compounds having a higher degree of filling of glass fillers (B) in the layer (S1). In addition, the tool surface has a smaller influence on the surface quality so that a good surface quality can nevertheless be implemented even with actually suboptimal tool surfaces. This reduces the surface roughness and the haze of the molded body and increases its transparency. A very resistant layer (S2), (S3), or (S4) can furthermore provide the multilayer molded body with an overall better chemical resistance because the possibly less resistant layer (S1) is not in direct contact with the chemicals. In this connection, with a suitable selection of the outwardly disposed layers (S2) to (S4), a multilayer molded body having good stress crack resistance can be obtained. The resistance toward media and the transparency and the haze can thus be increased without suffering large compromises in the mechanical properties.

In accordance with another preferred embodiment, the molded body has an arithmetical mean roughness Ra of at most 0.1 μm, preferably of 0.01 to 0.08 μm, in particular of 0.02 to 0.06 μm, and/or a surface roughness $R_z$ of at most 1.5 μm, preferably of 0.05 to 1.0 μm, in particular from 0.1 to 0.9 μm, respectively determined in accordance with DIN EN ISO 4287 (2010-07) by means of a MarSurf XR1 Surface Measuring Station.

In accordance with a further preferred embodiment of the present invention, the transparency measured in accordance with ASTM D1003 at a multilayer molded body (plate with the dimension 60×60×2 mm) produced from the polyamide molding compound and comprising 20 wt % glass fillers (B) in the layer (S1), preferably in the form of glass fibers, in particular in the form of E-glass fibers, amounts to at least 80%, preferably at least 83%, and particularly preferably at least 85% and the haze measured in accordance with ASTM D1003 amounts to a maximum of 40%, preferably to a maximum of 35%, particularly preferably to a maximum of 30%, and very particularly preferably to a maximum of 25%.

Preferred layer sequences are (S1)/(S2) or (S2)/(S1)/(S2) or (S3)/(S1)/(S4). The layers are here indicated from top to bottom, i.e. (S1)/(S2) means, for example, that (S1) forms the topmost layer and (S2) the bottommost layer of the molded body.

In accordance with a further preferred embodiment of the present invention, the molded body has the layers (S2), (S3), or (S4) that are based on the polyamide mixture (A), or on polyamide (A1), or on polyamide (A2), or on a polyamide different from (A1) and (A2) and that preferably consist thereof. The term "based/basis" in the sense of the present application is to be interpreted such that the layer comprises at least 50%, preferably at least 70%, and particularly preferably at least 90%, of this layer.

Another preferred embodiment of the present invention provides that the mean layer thickness of the layer (S1) is at least 2 times as large, preferably at least 5 times as large, and particularly preferably at least 9 times as large, as the sum of all the mean layer thicknesses of the layers (S2), (S3), or (S4).

In accordance with another preferred embodiment of the present invention, the weight ratio of the layer (S1) in the molded body is at least 2 times larger, preferably at least 5 times larger, and particularly preferably at least 10 times, larger, than the weight ratio of all the layers (S2, (S3), and (S4) in the molded body.

In accordance with a further preferred embodiment of the present invention, the layers (S2), (S3), or (S4) are on the basis of a polyamide selected from the group comprising PA MACM12, PA MACMI/MACMT/12, PA 11, PA 12, and mixtures thereof or preferably consists thereof.

In accordance with another embodiment of the present invention, the layer (S2), (S3), or (S4) is back injection molded with the layer (S1) or the layers (S1) and (S2), (S3), or (S4) were produced by two-component or multi-component injection molding (mono-sandwich process), with the multilayer molded body being integrally produced in one injection molding cycle.

The subject matter in accordance with the invention will be explained in more detail with reference to the following examples without intending to restrict it to the specific embodiments shown here.

1 Measurement Methods

The following measurement methods were used within the framework of this application:

Surface Roughness, $R_a$, $R_z$

The roughness of the test specimens was measured in accordance with DIN EN ISO 4287 (2010-07) using a MarSurf XR1 Surface Measuring Station of Mahr GmbH (DE). The roughness values, that is, the arithmetical mean roughness Ra and the surface roughness $R_z$, are given in micrometers (μm).

Haze, Transparency

The transparency and haze were measured in accordance with ASTM D1003 on a measuring device Haze Gard Plus of BYK Garder at plates of 2 mm thickness (60 mm×60 mm surface) with CIE light type C at 23° C. The surface of the specimen (plate 60×60×2 mm) had an arithmetical mean roughness $R_a$ and a surface roughness $R_z$ as explicitly specified for the molding compounds in accordance with the examples and comparison examples in Table 2 or for the multilayer molded body. The manufacture of the test specimens will be described under item 3.3.

Melting Point ($T_m$) and Enthalpy of Fusion ($\Delta H_m$)

The melting point and the enthalpy of fusion were determined in accordance with ISO 11357-3 (2013) on pellets. The DSC (differential scanning calorimetry) measurements were performed at a heating rate of 20 K/min.

Glass Transition Temperature, $T_g$

The determination of the glass transition temperature $T_g$ took place in accordance with ISO 11357-2 (2013) at pellets by means of differential scanning calorimetry (DSC). It was performed in each of the two heating steps at a heating rate of 20 K/min. The sample was quenched in dry ice after the first heating. The glass transition temperature ($T_g$) was determined in the second heating step. The center of the glass transition zone, that was here specified as the glass transition temperature, was determined using the "half height" method.

Relative Viscosity, $n_{Rel}$

The relative viscosity was determined in accordance with ISO 307 (2007) at 20° C. 0.5 g polymer pellets were weighed into 100 ml m-cresol for this purpose; the calculation of the relative viscosity (RV) after $RV=t/t_0$ took place on the basis of the section 11 of the standard.

Modulus of Elasticity

The determination of the modulus of elasticity and of the tensile strength was carried out in accordance with ISO 527 (2012) at 23° C. at a tensile speed of 1 mm/min at an ISO tensile rod (type A1, mass 170×20/10×4) manufactured in accordance with the standard: ISO/CD 3167 (2003).

Failure Stress and Elongation at Break

The determination of the failure stress and of the elongation at break was carried out in accordance with ISO 527 (2012) at 23° C. at a tensile speed of 5 mm/min at an ISO tensile rod, type A1 (mass 170×20/10×4) manufactured in accordance with the standard ISO/CD 3167 (2003).

Impact Resistance According to Charpy

The determination of the impact resistance according to Charpy was carried out in accordance with ISO 179/2*eU (1997, *2=instrumented) at 23° C. at an ISO test rod, Type B1 (mass 80×10×4 mm), manufactured in accordance with the standard ISO/CD 3167 (2003).

Notch Impact Resistance According to Charpy

The determination of the notch impact resistance according to Charpy was carried out in accordance with ISO 179/2*eA (1997, *2=instrumented) at 23° C. at an ISO test rod, Type B1 (mass 80×10×4 mm), manufactured in accordance with the standard ISO/CD 3167 (2003).

Heat Deflection Temperature (HDT)

The heat deflection temperature (HDT) or also deformation temperature under load is reported as HDT/A and/or HDT/B. HDT/A corresponds to method A having a bending stress of 1.80 MPa and HDT/B corresponds to method B having a bending stress of 0.45 MPa. The HDT values were determined in accordance with ISO 75 (2013-04) at ISO baffle rods with the dimensions 80×10×4 mm.

Measuring the Refractive Index of Glass Fibers

The determination of the refractive index of glass fibers and of polyamide (A1) took place using the Beck's line method and using immersion fluids with respect to 589 nm based on method B of ISO 489 (1999-04).

Measuring the Refractive Index of Polyamides

The refractive index of the polyamide (A2) was determined in accordance with ISO 489 (1999-04) at plates of 2 mm thickness (60×60×2 mm) at a wavelength of 589 nm and at a temperature of 23° C. by means of an Abbe refractometer of Carl Zeiss (method A). 1-1-bromonaphthalene was applied as the contact fluid between the examined plate and the prism surface.

2 Starting Materials

The materials used in the examples and in the comparison examples are collated in Table 1.

TABLE 1

Materials used in the examples and in the comparison examples

| Components | Description | Manufacturer |
| --- | --- | --- |
| PA66<br>Component (A1) | PA 66 (Radipol ® A45)<br>Rel. viscosity = 1.85<br>Refractive index: 1.5360<br>Transparency: 59%; Haze: 100%; Tm: 260° C. | RadiciGroup |
| Polyamide 1<br>Component (A2) | PA 6I/MACMI/6T/MACMT (77/13/8/2)<br>Rel. viscosity = 1.42<br>Aromatic structural units: 50 Mol-%<br>Refractive index: 1.582<br>Transparency: 93%; Haze: 0.5%; Tg: 147° C. | EMS-CHEMIE AG<br>(Switzerland) |
| Polyamide 2<br>Component (A2) | PA 6I/6T/MACMI/MACMT/PACMI/PACMT/12<br>(39/39/7.1/7.1/2.5/2.5/2.8)<br>Rel. viscosity = 1.62<br>Aromatic structural units: 50 Mol-%<br>Refractive index: 1.583<br>Transparency: 93%; Haze: 0.5%; Tg: 159° C. | EMS-CHEMIE AG<br>(Switzerland) |
| Polyamide 3<br>Component (A2) | PA 6I/6T) (67/33)<br>Rel. viscosity = 1.54<br>Aromatic structural units: 50 Mol-%<br>Refractive index: 1.591<br>Transparency: 93%; Haze: 0.6%; Tg: 125° C. | EMS-CHEMIE AG<br>(Switzerland) |
| Glass fiber 1 | OC Micromax 771<br>Refractive index: 1.556 | Owens Corning |
| Glass fiber 2 | ECS 301T-3<br>Refractive index: 1.556 | CPIC (China) |

3 Examples and Comparison Examples 3.1 Manufacturing the Polyamide Molding Compounds The components are generally mixed (compounded) on standard compounding machines such as single-shaft or twin-shaft extruders or screw kneaders in the polymer melt to manufacture the plastic molding compound. The components are here individually metered into the feeder or are supplied in the form of a dry blend. If additives are used, they can be introduced directly or in the form of a master batch. In a dry blend manufacture, the dried polymer pellets and the additives are mixed. The mixing can take place under a dried protective gas to avoid moisture absorption.

The glass fibers used are metered into the polymer melt in the intended ratio via a side feeder and are further homogenized in the cylinder of the compounding machine. The metering of all the components into the feeder or side feeder is set via electronically controlled scales such that the desired quantity ratios of glass-polymer result therefrom.

The compounding takes place at set extruder cylinder temperatures of e.g. 230° C. to 350° C. Vacuum can be applied or atmospheric degassing can take place in front of the nozzle. The melt is output into a water bath in extruded form and is pelletized. An underwater pelletization or a strand pelletization is preferably used for pelletization.

The plastic molding compound thus preferably obtained in pellet form is subsequently dried and can then be further processed to molded bodies by injection molding. This takes place via a repeat melting of the dry pellets in a heatable cylinder and conveying the melt into an injection mold in which the melt can solidify.

3.2 Manufacture of the Polyamide Molding Compound in Accordance with Examples B1 to B4 and VB1 to VB3

The molding compounds for the examples B1 to B4 and for the comparison examples VB1 to VB3 were manufactured on a twin shaft extruder of the company Werner and Pfleiderer, Type ZSK25. The polyamides (A1) and (A2) were metered into the feed of the extruder via metering trolleys in the quantity portions specified in Table 2. The glass fibers used were conveyed into the polymer melt in the intended ratio via a side feeder and were further homogenized in the cylinder of the compounding machine.

The temperature of the first housing was set to 80° C.; that of the remaining housings in an increasing manner from 270 to 300° C. A speed of 200 r.p.m. and a throughput of 12 kg/h were used and degassing took place in the third zone in front of the nozzle in the nitrogen stream. The polyamide molding compound output as a strand was cooled in a water bath, pelletized, and the obtained pellets were dried at 80° C. in vacuum at 30 mbar to a water content of below 0.1 wt %.

3.3 Manufacture of the Test Specimens

Tensile rods, baffle rods, and plates were injected from the pellets obtained as test specimens at which the properties specified in Table 2 were determined. The test specimens were manufactured on an injection molding machine of Arburg, model Allrounder 420 C 1000-250. Increasing cylinder temperatures from 270° C. to 300° C. were used here. The melt temperature for all the injected molded bodies amounted to 295-305° C. in each to case. The tool temperature was at 120° C. in each case in the case of plates (2 mm×60 mm×60 mm). The tool temperatures of the tensile rods and of the baffle rods were 80° C. in each case. The test specimens were used in the dry state if not otherwise specified; for this purpose, they were stored for at least 48 h at room temperature after the injection molding in a dry environment, i.e. over silica gel.

In the case of plates (2 mm×60 mm×60 mm) for determining the optical properties, the surfaces of the cavity of the injection mold were given a mirror finish so that the molded bodies (plates) had a high gloss surface having an arithmetical mean roughness Ra of 0.01 to 0.08 μm and/or a surface roughness Rz of 0.05 to 1.0 μm, in accordance with DIN EN ISO 4287.

3.4 Results

TABLE 2

Examples and comparison examples.

| | Unit | B1 | B2 | B3 | B4 | VB1 | VB2 | VB3 |
|---|---|---|---|---|---|---|---|---|
| Components | | | | | | | | |
| PA 66 Component (A1) | Wt % | 44 | 36 | 25 | 40 | — | — | — |
| Proportion of (A1) in (A) | Wt % | 55 | 45 | 50 | 50 | — | — | — |
| Polyamide 1 Component (A2) | Wt % | — | 44 | — | — | — | — | — |
| Polyamide 2 Component (A2) | Wt % | 36 | — | — | — | 80 | — | — |
| Polyamide 3 Component (A2) | Wt % | — | — | 25 | 40 | — | 80 | 50 |
| Proportion of (A2) in (A) | Wt % | 45 | 55 | 50 | 50 | — | — | — |
| Glass fiber 1 | Wt % | — | — | — | 20 | — | — | — |
| Glass fiber 2 | Wt % | 20 | 20 | 50 | — | 20 | 20 | 50 |
| Properties | | | | | | | | |
| Haze of the molding compound | % | 13 | 13 | 33 | 15 | 91 | 97 | 100 |
| Transparency of the molding compound | % | 85 | 88 | 83 | 91 | 86 | 81 | 79 |
| Ra Plate 60 × 60 × 2 mm | μm | 0.065 | 0.068 | 0.089 | 0.061 | 0.059 | 0.063 | 0.088 |
| Rz Plate 60 × 60 × 2 mm | μm | 0.845 | 0.882 | 0.957 | 0.788 | 0.790 | 0.824 | 0.974 |
| Modulus of elasticity | MPa | 7210 | 7340 | 17120 | 7360 | 6160 | 7740 | 16900 |
| Failure stress | MPa | 170 | 160 | 257 | 163 | 128 | 138 | 248 |
| Elongation at break | % | 3.2 | 2.7 | 2.4 | 3.7 | 3.0 | 2.4 | 1.8 |
| Impact resistance | kJ/mm$^2$ | 49 | 37 | 85 | 73 | 37 | 35 | 58 |
| Notch impact resistance | kJ/mm$^2$ | 9.6 | 9.4 | 12 | 6.9 | 8.6 | 8.6 | 10 |
| HDT A | ° C. | 221 | 223 | 252 | 224 | 148 | 114 | 117 |
| HDT B | ° C. | 225 | 227 | 258 | 229 | 153 | 120 | 122 |

Manufacture of the Multilayer Molded Bodies

The following multilayer molded bodies of the dimension 60×60×2 mm were manufactured by back injection molding of films of non-reinforced, transparent polyamide using the polyamide molding compound in accordance with the invention. The manufacture took place on an injection molding machine of Arburg 420C 1000-250 using the conditions described above for the 60×60×2 mm plates. Two extruded films composed of the polyamide 2 (PA 6I/6T/MACMI/MACMT/PACMI/PACMT/12; component (A2)) each having a thickness of 100 μm were cut to the size 60×60×0.1 mm, were placed into the injection molding tool, and the remaining cavity between the two films after the closing of the tool was filled by injection the polyamide molding compound in accordance with the invention from example B1. After cooling, the multilayer molded body was demolded and the transparency and haze were determined in accordance with ASTM D1003. The insertion films of polyamide 2 were no longer able to be removed from the multilayer molded body after the injection molding process, but are rather connected with material continuity to the molding compound from the examples B1.

| Multilayer molded body 1 | | |
|---|---|---|
| Design of the multilayer molded body of the dimension 60 × 60 × 2 mm | External Central Internal | Film of polyamide 2 (t) Molding compound of example B1 Film of polyamide 2 (b) |
| Transparency | % | 89 |
| Haze | % | 11 |
| Ra (t/b) (plate 60 × 60 × 2 mm) | μm | 0.026/0.027 |
| Rz (t/b) (plate 60 × 60 × 2 mm) | μm | 0.314/0.355 |

4 Discussion of the Results

It can be seen from Table 2 that the polyamide molding compounds in accordance with the invention in accordance with examples B1, B2, and B4 have a very low haze of 13 to 15% and a high transparency of 85 to 91%. Even the polyamide molding compound filled with 50 wt % glass fiber in accordance with B3 still demonstrates a haze of 33% and a transmission of 83.

The polyamide molding compounds in accordance with the comparison examples VB1 and VB2 in contrast demonstrate a much higher haze of 91% or 97% despite a proportion of glass fiber of only 20 wt %. The comparison of the molding compound with that in accordance with VB3 illustrates a significantly better haze is also obtained for every high proportions of glass filler, here of 50 wt %.

The comparison of the examples B1 to B4 in accordance with the invention with the comparison examples VB1 and VB2, that each only comprise one polyamide (A2), illustrates that a mixture of the polyamides (A1) and (A2) is absolutely necessary to achieve good haze values.

Providing polyamide molding compounds reinforced with a glass filler that also have very good optical properties, in particular low haze, in addition to good mechanical properties is therefore surprisingly only successful by the specific feature combination of the invention as described herein.

The invention claimed is:

1. A polyamide molding compound comprising the following components:
   (A) 40 to 95 wt % of a polyamide mixture consisting of the polyamides (A1) and (A2), wherein
   (A1) 42 to 68 wt % of at least one semi-crystalline polyamide is selected from the group comprising PA 46, PA 66, PA 66/6, PA 610, PA 612, PA 614, PA 615, PA 616, and mixtures thereof; and
   (A2) 32-58 wt % of at least one transparent semi-aromatic polyamide having at least 30 mol % of monomers having aromatic structural units, with respect to the total quantity of diamines and dicarboxylic acids is in the polyamide (A2) that is amorphous or microcrystalline;
   (B) 5 to 50 wt % of at least one glass filler having a refractive index in the range from 1.540 to 1.600; and
   (C) 0 to 10 wt % of at least one additive;
   wherein the weight proportions of the components (A) to (C) add up to 100% by weight of the component (A) and the weight proportions of the components (A1) and (A2) add up to 100% by weight of component (A);
   wherein the polyamide molding compound has a transparency of at least 80% and a haze of at most 40%;
   wherein the transparency and haze of the polyamide molding compound are measured in accordance with ASTM D1003 on a molded plate of the polyamide molding compound having a dimension of 60 mm×60 mm×2 mm.

2. The polyamide molding compound in accordance with claim 1, wherein the polyamide mixture (A) comprises 45 to 65 wt % polyamide (A1); and 35 to 55 wt % polyamide (A2); and/or
   the proportion of component (A) in the polyamide molding compound is in the range from 49 to 90 wt % with respect to the sum of components (A) to (C); and/or
   the proportion of component (B) in the polyamide molding compound is in the range from 10 to 45 wt % with respect to the sum of the components (A) to (C); and/or
   the proportion of component (C) in the molding compound is in the range from 0 to 6 wt % with respect to the sum of components (A) to (C).

3. The polyamide molding compound in accordance with claim 1, wherein the polyamide (A1) is PA 66.

4. The polyamide molding compound in accordance with claim 1, wherein the at least one transparent polyamide (A2) comprises at least 35 mol % of monomers having aromatic structural units, with respect to the total quantity of diamines and dicarboxylic acids.

5. The polyamide molding compound in accordance with claim 1, wherein the monomers having aromatic structural units for the transparent polyamide (A2) are selected from the group consisting of terephthalic acid, isophthalic acid, naphthalenedicarboxylic acid (NDA), biphenyldicarboxylic acid, 4,4'-diphenyl ether dicarboxylic acid, 4,4'-diphenylmethanedicarboxylic acid, and 4,4-diphenylsulfonedicarboxylic acid, 1,5-anthracene dicarboxylic acid, p-terphenylene-4,4'-dicarboxylic acid, 2,5-pyridine dicarboxylic acid, xylylenediamine, and mixtures thereof.

6. The polyamide molding compound in accordance with claim 1, wherein the transparent polyamides (A2) are made up of the following monomers:
   (a-A2) 0 to 100 mol % of cycloaliphatic diamines, with respect to the total quantity of diamines;
   (b-A2) 0 to 100 mol % of diamines having aromatic structural units, with respect to the total quantity of diamines;
   (cA-2) 0 to 100 mol % of open-chain, aliphatic diamines, preferably having 6 to 10 carbon atoms, in particular having 6 carbon atoms, with respect to the total quantity of diamines;

(d-A2) 0 to 70 mol % of open-chain aliphatic dicarboxylic acids, with respect to the total quantity of dicarboxylic acids;
(e-A2) 30 to 100 mol % of aromatic dicarboxylic acids, with respect to the total quantity of dicarboxylic acids;
(f-A2) 0 to 70 mol % of cycloaliphatic dicarboxylic acids, with respect to the total quantity of dicarboxylic acids; and
(g-A2) 0 to 40 wt % of lactams and/or aminocarboxylic acids having 6 to 12 carbon atoms, with respect to the total quantity of the monomers (a-A2) to (g-A2),
where the sum of the diamines (a-A2), (b-A2), and (c-A2) produces 100 mol %;
where the sum of the dicarboxylic acids (d-A2), (e-A2), and (f-A2) produces 100 mol %; and
where the sum of the monomers (b-A2) and (e-A2) amounts to at least 30 mol %, with respect to the sum of the total diamines and of the total dicarboxylic acids in the polyamide (A2).

7. The polyamide molding compound in accordance with claim 6, wherein
the cycloaliphatic diamine (a-A2) is selected from the group consisting of bis(4-amino-3-methylcyclohexyl) methane, bis-(4-aminocylcohexyl)methane, bis-(4-amino-3-ethylcyclohexyl)methane, bis-(4-amino-3,5,-dimethylcyclohexyl)methane, 2,6-norbornane diamine, 1,3-diaminocyclohexane, 1,4-diaminocyclohexanediamine, isophorone diamine, 1,3-bis-(aminomethyl)cyclohexane, 1,4-bis-(aminomethyl)cyclohexane, 2,2-(4,4'-diaminodicyclohexyl)propane, and mixtures thereof;
the aromatic diamine (b-A2) is selected from xylylenediamines;
and/or
the diamine (c-A2) is selected from the group consisting of 1,4-butanediamine, 1,5-pentanediamine, 2-methyl-1,5,pentanediamine, hexanediamines, 2,2,4-trimethyl-1,6-hexamethylenediamine, 2,4,4-trimethyl-1,6-hexamethylenediamine, nonanediamines, 1,10-decanediamine, 1,11-undecanediamine, 1,12-dodecanediamine, 1,13-tridecanediamine, 1,14-tetradecanediamine, 1,18-octadecanediamine, and mixtures thereof;
and/or
the aliphatic dicarboxylic acid (d-A2) is selected from the group consisting of 1,6-apidic acid, 1,9-nonanedioic acid, 1,10-decanedioic acid, 1,11-undecanedioic acid, 1,12 dedecanedioic acid 1,13-tricanedioic acid, 1,14-tetradecanedioic acid, 1,16-hexxdecanedioic acid, 1,18-octadecanedioic acid, and mixtures thereof;
and/or
the aromatic dicarboxylic acid (e-A2) is selected from the group consisting of terephthalic acid, isophthalic acid, naphthalenedicarboxylic acid (NDA), biphenyldicarboxylic acid, 4,4'-diphenyl ether dicarboxylic acid, 4,4'-diphenylmethanedicarboxylic acid, and 4,4'-diphenylsulfonedicarboxylic acid, anthracene dicarboxylic acid, p-terphenylene-4,4''-dicarboxylic acid, and 2,5-pyridinedicarboxylic acid, and mixtures thereof;
and/or
the cycloaliphatic dicarboxylic acid (f-A2) is selected from the group consisting of 1,3-cyclopentanedicarboxylic acid, 1,3-cyclohexanedicarboxylic acid, 1,4-cyclohexanedicarboxylic acid, 2,3-norbornanedicarboxylic acid, 2,6-norbornanedicarboxylic acid, and mixtures thereof;
and/or the lactam and/or the α,ω-aminocarboxylic acids (g-A1) and/or (g-A2) is/are selected from the group consisting of m-aminobenzoic acid, p-aminobenzoic acid, caprolactam (CL), α,ω-aminocaproic acid, α,ω-aminoheptanoic acid, α,ω-aminooctanoic acid, α,ω-aminononanoic acid, α,ω-aminodecanoic acid, α,ω-aminoundecanoic acid (AUA), laurolactam (LL), and α,ω-aminododecanoic acid (ADA).

8. The polyamide molding compound in accordance with claim 1, wherein the transparency of the polyamide molding compound amounts to at least 83%; and/or
the haze of the polyamide molding compound amounts to a maximum of 35%, or wherein the molded body has an arithmetical mean roughness Ra determined in accordance with DIN EN ISO 4287 (2010-07) by means of a MarSurf XR1 Surface Measuring Station of at most 0.12 μm and/or has a surface roughness $R_z$ of at most 1.50 μm.

9. The polyamide molding compound in accordance with claim 1, wherein the polyamide (A2) is selected from the group consisting of PA 6I/6T, PA 10I/10T, PA DI/DT (D=2-methyl-1,5-pentanediamine), PA MACMI/12, PA MACMI/1012, PA MACMT/12, PA MACMI/MACMT/12, PA MACMI/MACMT, PA MACMI/MACMT/MACM12, PA 6I/6T/MACMI/MACMT, PA 6I/6T/MACMI/MACMT/12, PA 6I/MACMI, PA 6I/6T/PACMI/PACMT, PA 6I/612/MACMI/MACM12, PA 6T/612/MACMT/MACM12, PA 6I/6T/612/MACMI/MACMT/MACM12, PA 6I/6T/MACMI/MACMT/PACMI/PACMT, PA 6I/6T/MACMI/MACMT/PACMI/PACMT/12, PA MACMI/MACMT/MACM36, PA MACMI/MACM36, PA MACMT/MACM36, PA 12/PACMI, PA 12/MACMT, PA 6/PACMT, PA 6/PACMI, PA MXDI, PA MXDI/MXD6, PA MXDI/MXD10, PA MXDI/MXDT, PA MXDI/MACMI, PA MXDI/MXDT/MACMI/MACMT, PA 6I/6T/BACI/BACT, PA MACMI/MACMT/BACI/BACT, PA 6I/6T/MACMI/MACMT/BACI/BACT, and mixtures thereof.

10. The polyamide molding compound in accordance with claim 1, wherein the at least one glass filler (B) is selected from the group consisting of glass fibers, ground glass fibers, glass particles, glass flakes, glass spheres, hollow glass spheres, and combinations thereof.

11. The polyamide molding compound in accordance with claim 1, wherein the glass type of the at least one glass filler (B) is selected from the group consisting of E-glass, E-CR-glass, R-glass, AR-glass, and mixtures of glass having substantially the same refractive index.

12. The polyamide molding compound in accordance with claim 1, wherein the at least one additive (C) is selected from the group consisting of inorganic and organic stabilizers, monomers, impact modifiers, lubricants, colorants, marking means, photochromic agents, demolding means, condensation catalysts, chain regulators, foaming agents, anti-blocking agents, optical brighteners, non-halogen flame retardants, natural sheet silicates, synthetic sheet silicates, nanoscale fillers having a particle size (d90) of a maximum of 100 nm, and mixtures thereof.

13. The polyamide molding compound in accordance with claim 1, wherein component (A2) has a glass transition temperature determined in accordance with ISO 11357-2 of at least 120° C.

14. A molded body comprising a polyamide molding compound in accordance with claim 1.

15. The molded body in accordance with claim 14, which is a multilayer molded body.

16. The polyamide molding compound in accordance with claim 5, wherein the monomers having aromatic structural units for the transparent polyamide (A2) are selected from the group of terephthalic acid, isophthalic acid, 1,5-naphthalenedicarboxylic acid, 2,6-naphthalenedicarboxylic acid, and mixtures thereof.

17. The polyamide molding compound in accordance with claim 5, wherein the monomers having aromatic structural units for the transparent polyamide (A2) are selected from the group of terephthalic acid, isophthalic acid, 1,5-naphthalenedicarboxylic acid, 2,6-naphthalenedicarboxylic acid, meta-xylylenediamine, and mixtures thereof.

* * * * *